United States Patent
Dollar et al.

(10) Patent No.: US 12,049,227 B2
(45) Date of Patent: Jul. 30, 2024

(54) METHOD FOR DETERMINING A SPEED PROFILE MINIMIZING THE POLLUTANT EMISSIONS OF A VEHICLE

(71) Applicant: IFP Energies nouvelles, Rueil-Malmaison (FR)

(72) Inventors: Robert Austin Dollar, Clemson, SC (US); Antonio Sciarretta, Rueil-Malmaison (FR); Laurent Thibault, Rueil-Malmaison (FR); Mohamed Laraki, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 308 days.

(21) Appl. No.: 17/502,236

(22) Filed: Oct. 15, 2021

(65) Prior Publication Data
US 2022/0118986 A1  Apr. 21, 2022

(30) Foreign Application Priority Data
Oct. 16, 2020  (FR) ...................................... 2010614

(51) Int. Cl.
*B60W 40/105* (2012.01)
*B60W 10/06* (2006.01)
(Continued)

(52) U.S. Cl.
CPC .......... *B60W 40/105* (2013.01); *B60W 10/06* (2013.01); *B60W 40/107* (2013.01);
(Continued)

(58) Field of Classification Search
CPC .... B60W 40/105; B60W 10/06; B60W 10/18; B60W 20/16; B60W 40/107;
(Continued)

(56) References Cited

U.S. PATENT DOCUMENTS

| 2009/0240415 A1* | 9/2009 | Sukaria ............... F16H 61/0213 |
| | | 701/84 |
| 2010/0211247 A1* | 8/2010 | Sherony .............. B60W 40/076 |
| | | 701/1 |

(Continued)

FOREIGN PATENT DOCUMENTS

| BE | 1019390 A1 | 6/2012 |
| CN | 105539448 A | 5/2016 |

(Continued)

OTHER PUBLICATIONS

Huang, Yuhan, et al. "Eco-driving technology for sustainable road transport: A review." Renewable and Sustainable Energy Reviews 93 (2018): 596-609).

(Continued)

*Primary Examiner* — Thomas Ingram
*Assistant Examiner* — Faris Asim Shaikh
(74) *Attorney, Agent, or Firm* — Fitch, Even, Tabin & Flannery LLP

(57) ABSTRACT

The invention is a method for determining a speed profile for minimizing emissions of at least one pollutant generated by a vehicle during a journey. The method requires a model of the vehicle dynamics, an analytical model of the emissions of the pollutant, and at least one speed profile model divided into at least two phases, each of the phases corresponding to a traction acceleration mode of the vehicle with a number of acceleration modes preferably being five. Then, a speed profile minimizing the emissions of at least one pollutant is determined by seeking, from speed profiles with respect to the distance, duration, and initial and final speeds of the journey and distinguished by distinct phase durations with the speed profile for which the emissions of the pollutant are modelled is by use of an analytical model for which the pollutants are the lowest.

6 Claims, 1 Drawing Sheet

(51) Int. Cl.
*B60W 40/107* (2012.01)
*B60W 50/14* (2020.01)
*G07C 5/08* (2006.01)

(52) U.S. Cl.
CPC .......... *B60W 50/14* (2013.01); *G07C 5/0816* (2013.01); *G07C 5/0841* (2013.01); *B60W 2510/06* (2013.01); *B60W 2720/103* (2013.01)

(58) Field of Classification Search
CPC .......... B60W 40/109; B60W 2510/06; B60W 2720/103; B60W 2720/106; B60W 2050/0075; B60W 2556/10; B60W 30/188; B60W 2050/0028; B60W 2050/0031; B60W 2050/0034; B60W 50/0097; G07C 5/08; G07C 5/0816; G07C 5/0841
See application file for complete search history.

(56) References Cited

U.S. PATENT DOCUMENTS

| | | | | |
|---|---|---|---|---|
| 2011/0040438 | A1* | 2/2011 | Kluge | G01C 21/3469 701/31.4 |
| 2012/0326856 | A1* | 12/2012 | Levin | B60W 50/14 701/1 |
| 2013/0131956 | A1* | 5/2013 | Thibault | B60W 10/06 701/102 |
| 2013/0245943 | A1* | 9/2013 | Hiestermann | G01C 21/3469 701/533 |
| 2013/0325335 | A1* | 12/2013 | Kee | G01C 21/3469 701/527 |
| 2014/0172252 | A1* | 6/2014 | Siegel | F16H 61/0213 701/55 |
| 2017/0158199 | A1* | 6/2017 | Pallett | B60W 30/18163 |
| 2017/0205298 | A1* | 7/2017 | Maloum | B60W 20/10 |
| 2019/0071096 | A1* | 3/2019 | Leon Ojeda | B60W 30/143 |
| 2019/0102960 | A1* | 4/2019 | Thibault | G07C 5/0808 |
| 2019/0138669 | A1* | 5/2019 | Thibault | F02D 41/1467 |
| 2019/0221055 | A1* | 7/2019 | Chasse | G07C 5/0841 |
| 2019/0271254 | A1* | 9/2019 | Frobert | G01M 15/102 |
| 2020/0180633 | A1* | 6/2020 | Wu | B60W 30/18163 |
| 2020/0346659 | A1* | 11/2020 | Düser | B60W 30/18072 |

FOREIGN PATENT DOCUMENTS

| | | |
|---|---|---|
| EP | 2703209 A1 | 3/2014 |
| EP | 3462404 A1 | 4/2019 |
| FR | 2994923 A1 | 3/2014 |
| FR | 3049653 A1 | 10/2017 |
| WO | 2010081836 A1 | 7/2010 |
| WO | 2017051026 A1 | 3/2017 |

OTHER PUBLICATIONS

Mensing, Felicitas, et al. "Eco-driving: An economic or ecologic driving style?" Transportation Research Part C: Emerging Technologies 38 (2014): 110-121).

Johansson, Hakan, et al. "Impact of EcoDriving on emissions." International Scientific Symposium on Transport and Air Pollution, Avignon, France. 2003.

Liu, Jun, K. Kockelman, and Aqshems Nichols. "Anticipating the emissions impacts of smoother driving by connected and autonomous vehicles, using the moves model." Transportation Research Board 96th Annual Meeting. 2017.

Stern, Raphael E., et al. "Quantifying air quality benefits resulting from few autonomous vehicles stabilizing traffic." Transportation Research Part D: Transport and Environment 67 (2019): 351-365).

Thibault, L., Degeilh, P., Lepreux, O., Voise, L., Alix, G., and Corde, G. (2016). A new GPS based method to estimate real driving emissions. IEEE 19th International Conference on Intelligent Transportation Systems (ITSC) (pp. 1628-1633).

Liu, et al.; "Anticipating the Emissions Impacts of Smoother Driving by Connected and Autonomous Vehicles, Using the Moves Model"; Presented at the 95th Annual Meeting of the Transportation Research Board and published in Smart Transport for Cities & Nations: The Rise of Self-Driving & Connected Vehicles (2018), 22 pages.

\* cited by examiner

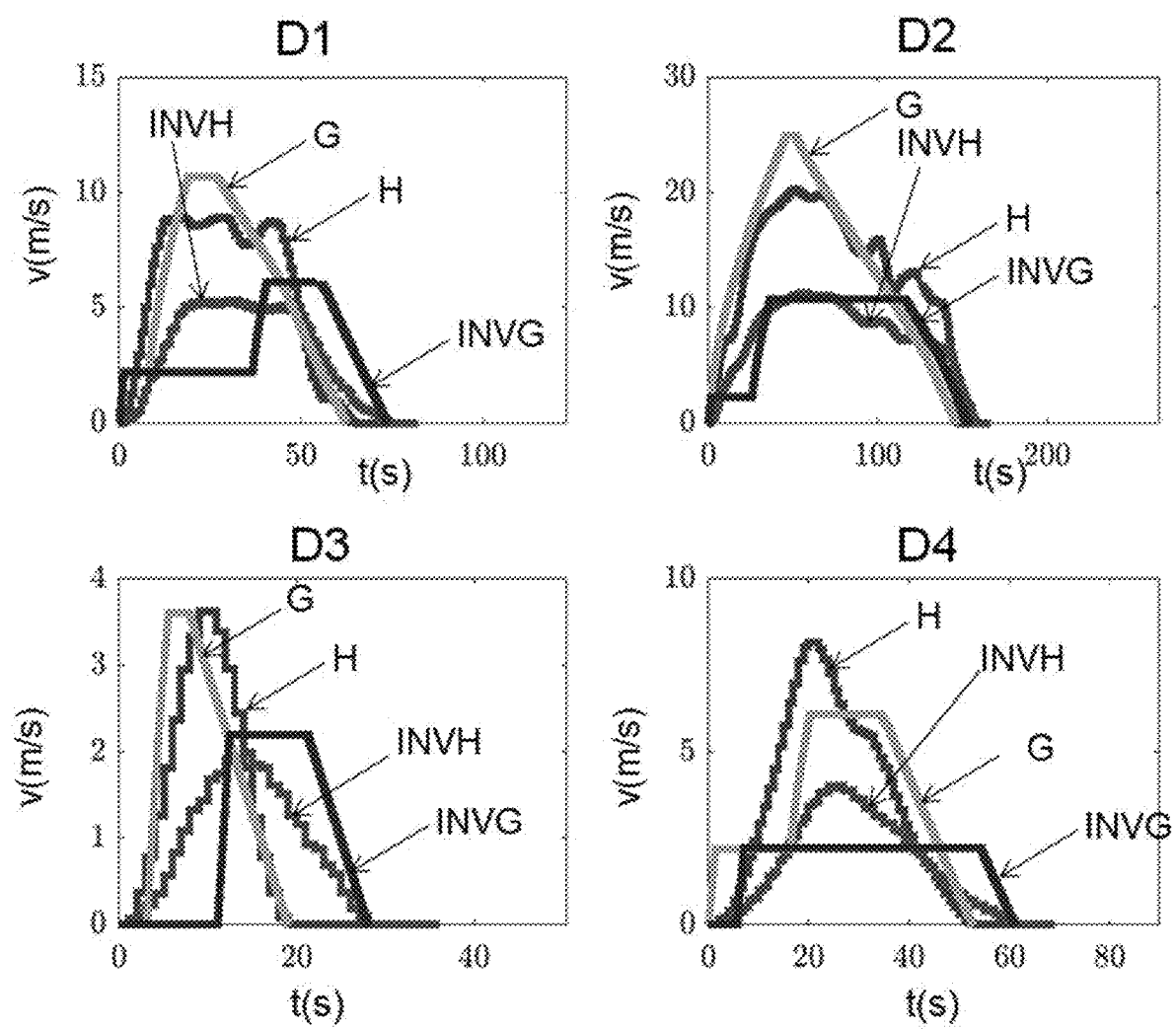

METHOD FOR DETERMINING A SPEED PROFILE MINIMIZING THE POLLUTANT EMISSIONS OF A VEHICLE

CROSS-REFERENCE TO RELATED APPLICATION

This application claims priority from French Application No. 20/10.614 filed Oct. 16, 2020 which is hereby incorporated herein by reference in its entirety.

BACKGROUND OF THE INVENTION

Field of the Invention

The present invention relates to the field of eco-driving, and more particularly to the field of reducing pollutant emissions associated with vehicle mobility.

Description of the Prior Art

Road traffic emissions, such as NOx, are dangerous to health and the environment. Its contribution to several harmful phenomena, such as acid rain, can lead to severe health complications, property damage and agricultural problems. While some NOx is produced naturally by lightning, combustion engines used in road vehicles also produce NOx when the nitrogen and oxygen in the cylinder are exposed to high temperatures. This has led car manufacturers to adopt three-way catalytic converters for gasoline engines and selective catalytic reduction (SCR) for newer diesel vehicles. However, for the same vehicle, emission levels can vary by up to three times depending on driving style and route (traffic, gradient, etc.). Thus, the conditions of use of a vehicle have a significant impact on pollutant emissions.

In this context of ever-increasing environmental and economic concerns, emphasis has been placed on improving vehicle operating conditions. In this category, eco-driving, which refers to improving the energy and environmental efficiency of driving, can play a very important role in reducing energy consumption and pollutant emissions. This is particularly relevant in an increasingly connected road network. Future automated vehicles could make particular use of eco-driving to save up to 15% of energy. Even conventional vehicles can benefit from eco-driving. This involves suggesting a speed path to the driver using a mobile device or vehicle information system.

Although there is a great deal of research into eco-driving techniques aimed at reducing fuel consumption and vehicle greenhouse gas emissions, solutions to reduce air pollutants, such as NOx, are poorly studied. Unfortunately, NOx emissions do not necessarily follow the same trend in fuel consumption as carbon dioxide ($CO_2$) emissions. Worse, the standard eco-driving advice of accelerating strongly and then maintaining speed results in significant excess emissions. Thus, the high-power engine operating points, which are best for fuel consumption, are the worst for pollutants, especially for NOx but also for carbon monoxide and particulates.

Prior Art

The following documents will be cited in the description:
[1] Huang, Yuhan, et al. "Eco-driving Technology for Sustainable Road Transport: A review." Renewable and Sustainable Energy Reviews 93 (2018): 596-609.
[2] Mensing, Felicitas, et al. "Eco-driving: An Economic or Ecologic Driving Style?" Transportation Research Part C: Emerging Technologies 38 (2014): 110-121).
[3] Johansson, Hakan, et al. "Impact of EcoDriving on Emissions." International Scientific Symposium on Transport and Air Pollution, Avignon, France. 2003.
[4] Liu, Jun, K. Kockelman, and Aqshems Nichols. "Anticipating the Emissions Impacts of Smoother Driving by Connected and Autonomous Vehicles, Using the Moves Model." Transportation Research Board 96th Annual Meeting. 2017.
[5] Stern, Raphael E., et al. "Quantifying Air Quality Benefits Resulting from Few Autonomous Vehicles Stabilizing Traffic." Transportation Research Part D: Transport and Environment 67 (2019): 351-365).
[6] Thibault, L., Degeilh, P., Lepreux, O., Voise, L., Alix, G., and Corde, G. (2016). A New GPS Based Method to Estimate Real Driving Emissions. IEEE 19th International Conference on Intelligent Transportation Systems (ITSC) (pp. 1628-1633).

In order to reduce the energy consumption and pollutant emissions of vehicles, several approaches have been proposed in recent years. They can be divided into several groups:
methods aimed at reducing the distances travelled by vehicles
methods aimed at increasing the number of passengers per vehicle (carpooling, etc.)
improving the efficiency of vehicles through new technologies
improving the operating conditions of current vehicles In this latter category, eco-driving, which refers to improving the energy and environmental efficiency of driving, can provide significant gains and is beginning to gain increasing prominence among policy makers and the scientific community. Eco-driving can include a number of strategies ranging from applying a constant speed to reducing acceleration and time at standstill. Optimal route choice can also play a role in reducing the distance travelled and thus the associated emissions. Overall, a 10% to 15% reduction in energy consumption can be achieved through eco-driving. These gains have been measured either in experimental conditions or in simulation. However, the majority of articles in the literature deal with the subject of eco-driving with the sole objective of reducing consumption without taking into account emissions other than CO2 (see for example reference [1]). Several studies, such as reference [2], show that there is a trade-off between reducing fuel consumption and reducing the associated pollutant emissions. In reference [3], the author measures the fuel consumption and emissions of 16 test drivers who have been trained in eco-driving. He found that, due to greater engine use at high-power points, some pollutant emissions increased. Thus, a reduction in pollutants, for example NOx, should be considered as one of the objectives of eco-driving. However, few scientific articles have addressed this issue.

Reference [4] describes an approach to smoothing speed profiles with spline functions that results in a 15% reduction in NOx emissions. However, the study and application of this approach are limited to autonomous vehicles and the resulting speed profile is not optimal.

In reference [5], the effect of traffic smoothing on air quality by controlling some autonomous vehicles is evaluated. However, the reduction of pollutant emissions is only a consequence rather than an objective of the controller.

It is also known that the applicant's FR 2 994 923 A1 relates to a method for determining an energy indicator of a journey of a vehicle and determining an optimal speed that minimizes energy consumption, and hence $CO_2$ emissions. However, the determination of an optimized speed profile to reduce emissions of other pollutants such as NOx is not explicitly described in this document.

In addition, US patent application 2015057906 A1 relates to a system and a method for determining real-time indications that make it possible to reduce the energy consumption of a vehicle, such as indications of speed, a rate of acceleration or deceleration, or a gear change. This document does not therefore suggest that the reduction of pollutant emissions should be taken into account in the eco-driving objective. Furthermore, the invention is based on heuristic considerations that are often sub-optimal.

BE 1019390 A1 relates to an autonomous system for continuous eco-driving training in real time. However, this document does not describe how the reduction of polluting emissions is taken into account in the eco-driving objective.

Furthermore, the proposed assistance is based solely on an evaluation of acceleration levels.

In addition, CN 105539448 A relates to a system for optimizing energy consumption depending on traffic conditions and real-time driving data. However, this document does not explicitly describe a minimization of polluting emissions with the objective of eco-driving. Moreover, the invention is expressed in terms of optimal consumption, which is not an easily interpretable indicator for a driver in order to modify driving.

The applicant's French patent application FR 3049653 A1 relates to a method and a system for determining the pollutant emissions of a vehicle macroscopic parameters. However, this document does not describe the determination of a speed profile specifically optimized to minimize pollutant emissions.

SUMMARY OF THE INVENTION

The present invention overcomes these drawbacks. In particular, the present invention relates to a method implemented by a computer for determining a speed profile of a vehicle for reducing pollutant emissions such as $CO_2$, NOx, or the like. The speed profile according to the invention can be generated in real time and can take into consideration the road traffic conditions. In an eco-driving context, the optimized speed profile according to the invention may be communicated to the driver, in real time or a posteriori. The optimized speed profile can also be used to directly control the speed trajectory of an autonomous vehicle.

The invention relates to a method for determining a speed profile for minimizing emissions of at least one pollutant generated by a vehicle during a journey, including at least:
  i. a model of the dynamics of the vehicle as a function of at least one of and traction acceleration of the vehicle;
  ii. an analytical model representative of the rate of the emissions of the at least one pollutant at an outlet of the vehicle, the analytical model being a function of speed and traction acceleration of the vehicle;
  iii. at least one speed profile model divided into at least two phases, each of the phases of the speed profile model corresponding to an acceleration mode of the vehicle, the number of the acceleration modes being predefined and preferably being five, an acceleration mode of the vehicle being defined by an analytical function depending on the current speed of at least one of the vehicle and parameters of the vehicle. The method comprises at least steps of, based on at least one item of information regarding the destination of a vehicle:
  a) measuring position and current speed of the vehicle during the journey of the vehicle;
  b) determining at least length, duration, initial speed and final speed of the vehicle for at least a portion of the journey, from at least the information on the destination of the vehicle, the measurement of the position of the vehicle and the current speed of the vehicle;
  c) determining a speed profile minimizing the emissions of at least one pollutant for at least a portion of the journey as follows:
     for each speed profile model, defining speed profiles with respect to the distance, the duration, the initial speed and the final speed of the portion of the journey, the speed profiles being distinguished by durations of each of the phases of the speed profile, and determining the emissions of the at least one pollutant for each of the speed profiles of the speed profiles by the analytical model; and
     selecting the speed profile minimizing the emissions of at least one pollutant determined for each of the speed profiles of each of the speed profiles defined for each of the speed profile models.

According to an embodiment of the invention, the acceleration modes of the vehicle may be selected from: zero traction acceleration, maximum traction acceleration of low pollutant emission operation of the engine of the vehicle, traction acceleration equal to resistive forces, traction acceleration corresponding to maximum braking of the vehicle, and maximum traction acceleration of vehicle.

According to an embodiment of the invention, one of the speed profile patterns can be divided into four phases comprising the successive acceleration modes: a maximum traction acceleration of a low pollutant emission operation of the engine of the vehicle, a traction acceleration equal to resistive forces, a zero traction acceleration, and a traction acceleration corresponding to the maximum braking of the vehicle.

According to another implementation of the invention, one of the speed profile patterns can be divided into five phases comprising successive acceleration of a maximum traction acceleration of a low pollutant emission operation of the engine of the vehicle, a traction acceleration equal to the resistive forces, a maximum traction acceleration of a low pollutant emission operation of the engine of the vehicle, a traction acceleration equal to resistive forces, and a traction acceleration of zero.

Alternatively, one of the speed profile patterns may be divided into five phases comprising the following successive acceleration modes: a maximum traction acceleration of the vehicle, a maximum traction acceleration of a low pollutant emission operation of the engine of the vehicle, a traction acceleration equal to resistive forces, a zero traction acceleration, a traction acceleration corresponding to a maximum braking of the vehicle.

According to an embodiment of the invention, the method may be implemented in real time and the portion of the journey may correspond to a part of the journey not yet made by the vehicle.

According to an embodiment of the invention, it is further possible, at the end of step c), to display the speed profile minimizing the emissions of at least one of the pollutants and control the vehicle according to the speed profile minimizing the emissions of at least one of the pollutants.

According to an embodiment of the invention in which the portion of the journey has already been performed by the vehicle, a speed profile realized by the vehicle can be determined on the basis of the measurement of the speed and the location of the vehicle during the portion of the journey, and an indicator quantifying a deviation between the speed profile minimizing the emissions of the at least one pollutant and the speed profile realized by the vehicle can be determined.

BRIEF DESCRIPTION OF THE DRAWINGS

Other features and advantages of the method according to the invention will become apparent on reading the following description of non-limiting exemplary embodiments, with reference to the appended figures described below.

FIG. 1, D1, D2, D3 and D4 show the speed profiles determined by the implementation of the method according to the invention which is applied to four journeys, compared to speed profiles according to the prior art determined for each of these four journeys and to the speed profiles of a driver for these four journeys.

DETAILED DESCRIPTION OF THE INVENTION

The method according to the invention makes it possible to determine a speed profile minimizing the emissions of at least one pollutant generated by the journey of a vehicle.

The method according to the invention can be used for motor vehicles. However, it can be used in the field of road transport, for the fields of two-wheelers, railways, ships aeronautics, hovercraft, and amphibious vehicles, etc. Generally speaking, the vehicle according to the invention is a motorized vehicle.

According to the invention, the term "pollutant" refers to nitrogen oxides (NOx), fine particles, carbon monoxides (CO), unburned hydrocarbons (HC), sulphur dioxide, as well as $CO_2$ and other greenhouse gases. The method according to the invention applies advantageously to NOx.

The method according to the invention makes possible minimizing the emissions of at least one, advantageously several, and preferably all, of these pollutants.

The motor vehicle according to the invention comprises an internal combustion engine (hereinafter referred to as the "engine"). The internal combustion engine may be a gasoline engine or a diesel engine. The engine may be used to drive the vehicle on its own, or it may be part of a hybrid propulsion system.

According to a first main variant of the invention, the method can be applied in real time, on the basis of measurements taken at a time t of the vehicle's journey, and to determine a speed profile minimizing emissions of at least one pollutant for at least a remaining portion of the vehicle's journey. The expression "remaining portion of the vehicle's journey" means at least a part of the vehicle's journey that has not yet been made by the vehicle. According to this variant, a remaining portion of the journey may be the portion of the journey to be covered by the vehicle between the present time (or current time), denoted time t, and at least one future time, denoted time t+Δt, of the journey. According to this variant of the invention Δt can vary from one second to several hours. Thus, the remaining portion of the journey may be between the current position at time t and a time t+Δt very close in time to the time t (one second for example), and between the current position at time t and the position of the final destination.

According to a second main variant of the invention, the method can be performed in real time to determine a speed profile minimizing emissions of at least one pollutant for a portion of the journey already made by the vehicle. It can then be stated that the method is implemented in real time to determine a speed profile a posteriori. For example, for at least one portion of a journey between two past breaking events (stop, strong deceleration, change of speed limit, etc.), on the basis of measurements carried out for a succession of time periods sampling the duration of this portion of journey made by the vehicle, an optimized speed profile is determined which makes it possible to minimize the emissions of at least one pollutant for this portion of journey, while respecting the duration of the journey for this portion.

According to a third main variant of the invention, the method can be performed a posteriori (that is after the entire journey has been made by the vehicle), on the basis of measurements taken for a succession of time periods sampling the total duration of the vehicle's journey, and to determine an optimized speed profile making it possible to minimize the emissions of at least one pollutant over the entire journey made by the vehicle, while respecting the journey time.

The method according to the invention requires information about the vehicle, which is hereinafter referred to by the term "macroscopic parameters". A macroscopic parameter is a general characteristic relating to the vehicle, its engine or its aftertreatment system. It is a constant parameter for a vehicle, corresponding to the vehicle manufacturer's data. The parameter is said to be macroscopic because it is determined on the scale of the vehicle, and it is not a microscopic parameter which can be determined, as for example in French patent application 2984557 corresponding to US patent application 2013/0158967), on the scale of a mesh representing a small portion of the combustion chamber. The macroscopic parameters allow the construction of macroscopic models representative of the vehicle.

Macroscopic parameters can be of three types:
parameters related to the general construction of the vehicle (for example: vehicle mass, transmission, etc.);
parameters related to the engine (for example: type of injection, engine size, type of engine, etc.); and
parameters related to the post-processing system (for example type of aftertreatment).

According to an embodiment of the invention, at least one macroscopic parameter can be obtained, selected from:
the type of engine (gasoline, diesel, etc.),
the level of approval standard (Euro 1, Euro 2, etc.),
the engine size,
the maximum torque and associated engine speed,
the maximum power and associated engine speed,
the mass of the vehicle,
the type of transmission of the vehicle (type and construction of gearbox, etc.),
the type of aftertreatment system,
the type of injection system, and
the architecture of the air loop (presence/absence of a recirculation system for burned gases, referred to as an EGR, use of a turbocharger, supercharging, etc.),
wheel dimensions, etc.

According to one variant, the macroscopic parameters can be obtained from a database, which lists the different vehicles in circulation. For example, the macroscopic parameters can be obtained by indicating the vehicle registration number, the database associating the plate number with its design (make, model, engine, etc.), and including the macroscopic parameters of the vehicle.

Alternatively, the macroscopic parameters can be constructor data entered by the user, in particular by an interface (for example a smartphone or a geolocation system).

The method according to the invention requires that a set of models, relating to the vehicle in question, are generated prior to determining the optimized speed profile for minimizing emissions of at least one pollutant. More precisely, according to the invention, the method requires at least the following models for the vehicle in question:
- a model of the dynamics of the vehicle as a function of at least one traction acceleration of the vehicle;
- an analytical model representative of the emission rate of at least one pollutant from the vehicle, the analytical model being a function of the speed and traction acceleration of the vehicle; and
- at least one speed profile model (or type) divided into at least two phases, each of the phases of the speed profile model corresponding to an acceleration mode of the vehicle and being defined by at least one of an analytical function depending on the current speed of the vehicle and on parameters of the vehicle, the number of the acceleration modes being predefined and preferably being five Traction acceleration is the traction force of the engine divided by the mass of the vehicle. Traction acceleration is equal to the sum of the total vehicle acceleration and the (positive) acceleration due to the resistive forces. These forces represent rolling resistance and engine braking losses.

The method according to the invention is presented hereafter in two steps: a first step A) of model generation, and a second step B) of determination of the optimized speed profile for minimizing the emissions of at least one pollutant, the first step A), however, is optional. Indeed, step B) can be performed and even repeated several times from previously established models, for example but not exhaustively as described in step A) below.

Steps A) and B) are preferably implemented by computer: smartphone, server and computer.

A) Generation of Vehicle-Related Models

During this optional step, a model of the dynamics of the vehicle under consideration, an analytical model representative of the emission rate of the vehicle under consideration, and at least one model of the speed profile of the vehicle under consideration are built. This step can advantageously be carried out before step B), and once only. The models resulting from this step are specific to the vehicle in question, or at least to the vehicle model in question.

A.1) Construction of a Vehicle Dynamics Model

In this step, a model of the vehicle dynamics is built as a function of at least one traction acceleration of the vehicle.

In general, a vehicle dynamics model relates at least one of the position altitude, speed of the vehicle to the torque and engine speed, by use of at least one macroscopic parameter relating to the vehicle. According to an embodiment of the invention, to build the model of the vehicle dynamics, at least one of the following macroscopic parameters can be used: mass of the vehicle, maximum power and the associated engine speed, maximum speed, type of transmission, etc.

According to an embodiment of the invention, a state representation is used to represent the vehicle dynamics. Such a representation is indeed adapted to the formulation of the optimization problem which will be described in step A.3) below and which determines models (or else types) of speed profiles.

According to an embodiment of the invention, the following state representation equations are used to express the vehicle dynamics:

$$\dot{s}=v \quad \dot{v}=u-r(v) \quad (2)$$

where:
- s is the path of the vehicle;
- v is the vehicle speed, an input to the vehicle dynamics model;
- u is the traction acceleration of the vehicle defined above. As will be described in step A.3) below, μ can also be a control variable of the optimization of determining patterns (or else types) of speed profiles.

According to an embodiment of the invention, the resistive acceleration r can be written as:

$$r(v)=a_r+c_r v^2+r_e(i_g) \quad (1)$$

where $a_r$ is the rolling resistance force divided by the vehicle mass, $c_r$ is the aerodynamic drag force divided by the vehicle mass, $r_e$ is the sum of the resistive forces in the transmission, and $i_g$ is the transmission ratio.

In a preferred embodiment of the invention, the resistive acceleration r can be represented by a constant $r_0$. According to this preferred embodiment of the invention, the following state representation for the dynamic model is obtained:

$$\dot{v}=u-r_0 \quad (3)$$

According to one embodiment of the invention, gear changes may be ignored and these gear changes are represented according to a fixed law based on the vehicle speed. According to one embodiment of the invention, the law specified in Table 1 can be used, which shows the number of the gearbox ratio used as a function of the maximum speed, as well as the engine/wheel speed ratio.

TABLE 1

| Ratio no. | Max speed (m/s) | Engine/wheel speed ratio |
| --- | --- | --- |
| 1 | 5.6944 | 12.635 |
| 2 | 10.5556 | 7.4314 |
| 3 | 15.0833 | 4.52 |
| 4 | 20.2778 | 3.2286 |
| 5 | 24.9444 | 2.5370 |
| 6 | N/A | 2.0416 |

A.2) Building of an Analytical Model of Emissions of at Least One Pollutant

In this step, a model of the emissions of at least one pollutant, preferably all pollutants, is built which is generated by the vehicle.

In general, pollutant modelling accounts for the engine model, via a macroscopic parameter, and relates engine speed and torque to the pollutant emissions from the engine, via at least one macroscopic parameter. This is also commonly referred to as engine model building.

According to an embodiment of the invention, at least one of the following macroscopic parameters can be used to build the engine model: engine size, type of engine, torque and power, air loop architecture, vehicle approval standard, etc.

According to an embodiment of the invention, the engine model can be constructed by combining an energy model and a model of the pollutants leaving the engine. The energy model links the engine torque and speed to the flow rates and temperatures of the fluids used in the combustion engine (fuels, intake gases, exhaust gases, possibly recirculation of burned gases) by use of at least one macroscopic parameter, for example the engine size, the type of engine, the maximum torque and power, the architecture of the air loop. The engine exhaust pollutant model relates fluid flow rates and temperatures used in the internal combustion engine to engine exhaust pollutant emissions, by use of at least one macroscopic parameter, for example vehicle type approval standard, engine type, air loop architecture.

The energy model makes possible estimation of the physical quantities for the current operating point (speed, torque). It is parameterized according to macroscopic parameters. The physical quantities estimated are the flow rates and temperatures of the fluids used in the combustion engine (fuels, intake gases, exhaust gases, possibly recirculation of burned gases).

The engine exhaust pollutant model uses information relating to engine speed and torque, and estimates from the energy model, to estimate engine exhaust pollutant emissions. It can be parameterized according to the general characteristics of the vehicle and the engine: the vehicle's approval standard, the type of engine, the architecture of the air loop, etc.

The estimation of engine exhaust pollutants can be performed in two steps:
  estimation of quasi-static emissions using a quasi-static model;
  and estimation of the impact of transient phenomena by use of a transient model.

Alternatively, the estimation of engine exhaust pollutants can be performed in a single step using the quasi-static model.

Estimating the quasi-static emissions of an engine at an operating point at a given time is equivalent to considering that the engine is experiencing stabilized operation at that operating point.

The estimation of the impact of transient phenomena (non-stabilized operation) makes possible accounting for transient phenomena, which generally lead to a surplus of polluting emissions.

Quasi-static pollutant models can be parameterized using macroscopic vehicle and engine parameters. They can be used to estimate, at any time, the quasi-static engine exhaust pollutant emissions on the basis of speed and torque estimates of the combustion engine and the energy model outputs. Quasi-static models can be written as:

$$PSME_{i\text{-}QS}=f(Ne, Cme)$$

With $PSME_{i\text{-}QS}$ being the quasi-static quantity of pollutants i at the engine outlet, Ne being the engine speed, and Cme being the engine torque, the type of function $f$ can differ depending on the type of pollutant being studied.

For example, the quasi-static NOx model can be the one described in the paper (U. Gartner, G. Hohenberg, H. Daudel and H. Oelschlegel, Development and Application of a Semi-Empirical NOx Model to Various HD Diesel Engines), and can be written as:

$$\log(NOx_{QS}) = a_0 + a_1*COC + a_2*m_{cyl} + a_3*m_{O2}$$

The coefficients $a_0$, $a_1$, $a_2$, $a_3$ are obtained from experimental data. One of the advantages of this model is that these coefficients vary little from one engine to another. This point is demonstrated in the Gartner paper mentioned above.

The particulate matter at the engine outlet results from a combination of two phenomena: formation and post-oxidation in the combustion chamber. These phenomena are influenced in the first order by the richness, the rpm, the amount of fuel, and the rate of gas burned. Thus, the static pattern of particulate matter at the engine outlet can be written in an equation of the form:

$$Soot_{QS}=f(AF_{ratio}, Ne, Fuel, BGR).$$

The function $f$ can be determined by correlation with experimental data. Similar models can be built for other pollutants.

For the embodiment, where the impact of transient phenomena is determined, the means described below can be implemented in addition. The air loop dynamics phenomena generate a deviation over the BGR rates (burned gas ratio, linked to the exhaust gas recirculation) and the richness with respect to the stabilized operating point, which has a strong impact on the pollutants, in particular the hydrocarbons HC, the carbon monoxide CO, and particles. The transient impact models are parameterized as a function of macroscopic engine parameters, in particular of the recovered air loop characteristics (atmospheric/supercharged, high-pressure exhaust gas recirculation $EGR_{HP}$/low-pressure exhaust gas recirculation $EGR_{BP}$).

These models make possible estimating the burned gas fractions $BGR_{dyn}$ and dynamic richness $AF_{ratio\text{-}dyn}$ from the quasi-static estimations and the variation of the estimated torque:

$$BR_{dyn}=f(BGR, Cme, dCme/dt)$$

$$AF_{ration\text{-}dyn}=f(AF_{ration}, Cme, dCme/dt).$$

A $Cor_{i\text{-}QS2TR}$ correction coefficient for each pollutant i can be calculated based on these dynamic quantities:

$$Cor_{i\text{-}QS2TR}=f(BGR_{dyn}, BGR, AF_{ratio\text{-}dyn}, AF_{ratio}).$$

These correction coefficients make possible estimation of the pollutant emissions at the engine outlet by accounting for the transient phenomena. For this purpose, the emissions of pollutant i at the engine outlet $PSME_i$ can be written by a formula of the type:

$$PSME_i=Cor_{i\text{-}QS2TR}*PSME_{i\text{-}QS}.$$

According to a particular embodiment of the invention, the considered engine model is a 2.0 liter supercharged diesel engine model with SCR, as described in document [6]. This model, known as CES Lite, first calculates the engine operating point and then the fuel consumption and pollutant emissions (in particular NOx, particulates and carbon monoxide) using quasi-static maps. First-order dynamics model the EGR and SCR systems. This engine model has the advantage of being relatively less computationally intensive than other models, such as the one described in EP 3440330 A1.

Advantageously, a quasi-static map representative of the engine model can be determined from the engine model in question by running this model for values for each of the inputs considered in this model, and the results for each value are stored in a map. In this way, the quasi-static map representative of the engine model determined in this way can be used instead of the engine model itself in the further course of the method, which allows a significant saving in computing time. This contributes in particular to making feasible a real-time application of the method according to the invention, including on a smartphone. In addition, the reduction of the engine model to a quasi-static mapping makes possible reducing the number of system states. This reduction of states allows the computation time of the dynamic programming to be reduced exponentially and adds complexity to the analysis according to the Pontriaguine Minimum Principle.

According to an embodiment of the invention, the CES Lite model described above is run for constant speeds and accelerations in order to obtain a stationary flow of pollutants and in particular of NOx, and the resulting function ṗ(v,u) is recorded in a map.

According to the invention, an analytical model is constructed representing the emission rate of at least one pollutant as a function of vehicle speed and traction acceleration u.

Indeed, since the optimization problem that is described in step A.3) is formulated as an optimal control, and is analysed according to the Pontriaguine Minimum Principle as will be described hereafter, it is necessary to have an analytical model representative of the flow of the emissions of at least one pollutant as a function of the vehicle speed and the control variable.

According to an embodiment of the invention, an analytical model is determined of the emission rate of at least one pollutant ṗ(v,u) of the piecewise-affine model type of the following form:

$$\dot{p} = \begin{cases} 0 & u \leq 0 \\ a_0 + a_1 v_c + a_2 u + a_3 u v_e & u \leq u_t(v_e) \\ b_0 + b_1 v_e + b_2 u + b_3 u v_e & u > u_t(v_e) \end{cases} \quad (4a)$$

$$v_e = \begin{cases} v_s & v \leq v_s \\ v & v > v_s \end{cases} \quad (4b)$$

where a0, a1, a2, a3, b0, b1, b2, and b3 are curve fitting coefficients (determined for example from a quasi-static mapping), and for which the saturation of the vehicle speed relative to the engine $v_e$ at the skidding speed vs accounts for the slip of the drive train at low speeds when the engine speed is constant. In addition, the acceleration threshold $u_t(v)$ is generated in order to impose continuity between the second and third equations of (4a). This results in a first rational function with coefficients dependent on those of (4a), i.e.:

$$u_t(v_e) = \frac{p_1 v_e + p_2}{v_e + q_2} \quad (5a)$$

$$p_1 = \frac{b_1 - a_1}{a_3 - b_3}, \; p_2 = \frac{b_0 - a_0}{a_3 - b_3}, \; q_1 = \frac{a_2 - b_2}{a_3 - b_3} \quad (5b)$$

In addition, a second rational function $u_s$ is defined which approximates the maximum acceleration of the vehicle as a function of speed, i.e.:

$$u_w(v_e) = \begin{cases} \overline{u} & v_e \leq v_w \\ \dfrac{w_1 v_e + w_2}{v_e + y_1} & v_e > v_w \end{cases} \quad (6)$$

This analytical model has the advantage of being very economical in terms of computing time and memory, which makes possible running on a smartphone and not only on a computer, unlike the CES Lite model mentioned above. This model is therefore suitable for an embedded application of the method according to the invention.

Advantageously, the transient during which the engine is reactivated is taken into account. With the engine off, the low-pressure EGR loop is filled with fresh air and requires time to fill with burned gases after the engine is reactivated. This results in NOx emission peaks. Advantageously, a NOx mass penalty is defined which is applied to each reactivation of the engine during the evaluation of the results, which can be written as:

$$x = \alpha_1 \left(\frac{N_e}{\alpha_2}\right)^{\alpha_3} \left(\alpha_4 (\hat{\Theta}_{cyl} - \alpha_5)\right)^{\alpha_6(1-\alpha_7 F_1)} \quad (7)$$

$$\dot{p}_{ss} = \frac{M_p}{M_e} \dot{m}_e x_{ss}, \; \dot{p}(t) = \frac{M_p}{M_e} \dot{m}_e x(t) \quad (8)$$

where the term Ne corresponds to the engine speed, $F_1$ is the intake richness, $\Theta_{cyl}$ the maximum combustion temperature, $\dot{m}_e$ is the exhaust gas mass flow rate, $M_e$ is the molar mass of the exhaust gas, $M_p$ is the molar mass of the pollutant considered, and $\alpha_i$ are calibration parameters of the model based on experimental measurements.

A.3) Definition of at Least One Speed Profile Model

In this step, at least one speed profile model of the vehicle journey is defined.

It can be shown analytically that solving an optimization problem aimed at determining a speed profile minimizing the modelled pollutant emissions as described above leads to speed profiles divided into at least two phases with each phase corresponding to a given acceleration mode of the vehicle, and the acceleration modes of the vehicle are of a predefined number, and preferably at most five. It is not essential to carry out this analytical solution for the implementation of the method according to the invention. It is sufficient for the invention to define speed profile models that satisfy the conclusions of the solution to this optimization problem. For information, the optimization problem discussed above can be solved according to the theory of optimal command (known by the acronym OCP for "Optimal Command Problem") applied to the analytical model of emission of at least one pollutant described above and taking into account constraints, with the traction acceleration as the control variable of the optimization problem. In particular, the Pontriaguine Minimum Principle can be applied. The term "traction acceleration" means the tractive force exerted by the vehicle's power train (which may include an internal combustion engine or electric machine) on the vehicle's wheels, divided by the mass of the vehicle.

According to the invention, a vehicle acceleration mode is defined by an analytical function depending on at least one of the current vehicle speed and vehicle parameters. Furthermore, according to the invention, the vehicle acceleration modes are predefined in number. According to a preferred embodiment of the invention, the number of acceleration modes is five.

According to a preferred embodiment of the invention, the acceleration mode of a given phase of a speed profile model may be selected from:

zero traction acceleration, i.e. $u_{zero}=0$. "Zero traction acceleration" is defined as an acceleration generated by a zero traction force of the vehicle's power train. In other words, in this case, the vehicle undergoes deceleration, equal to the resistive forces.

The traction acceleration corresponds to the resistive forces, i.e. $u_{res}=r(v)$ with r(v) defined in equation (1) above), which means that the vehicle remains at a constant speed. The expression "traction acceleration corresponding to the resistive forces" is defined as an acceleration generated by a traction force exerted by the vehicle's power train equal (in absolute value) to the resistive forces (generated by the vehicle's motion).

In other words, in this case, the acceleration experienced by the vehicle is zero.

The traction acceleration corresponding to the maximum braking of the vehicle, i.e. $u_{braking}=f(v)$ is where $f$ is a characteristic function of the vehicle and the engine, which means that the traction acceleration is negative. According to an embodiment of the invention, this acceleration can be considered as a constant. The expression "traction acceleration corresponding to the maximum braking (maximum braking force in real terms) of the vehicle" is understood to mean an acceleration generated by a traction force exerted by the vehicle's power train equal (in absolute value) to the maximum braking force of the vehicle. In other words, in this case, the vehicle undergoes maximum deceleration.

The traction acceleration $u_{NOx}$ corresponding to the maximum traction acceleration that must not be exceeded in order to remain within the engine's low pollutant (and in particular NOx) emission operating range. Above this acceleration, the pollutants increase exponentially. This acceleration may correspond to the limit value beyond which the use of burned exhaust gas recirculation (EGR) technology is no longer possible. According to one embodiment of the invention, this acceleration can be obtained from equation (5a) above, i.e.

$$u_{NOx} = \frac{p_1 v_e + p_2}{v_e + q_2}.$$

The expression "maximum traction acceleration of low-emission operation of the vehicle's engine" means an acceleration generated by a tractive force exerted by the vehicle's power train beyond which the pollutant emissions (by the vehicle's internal combustion engine) increase exponentially (or beyond which the use of the burned exhaust gas recirculation technology is no longer possible).

The maximum achievable traction acceleration of the vehicle, i.e. $u_{max}=f'(v)$ is where $f'$ is a function characteristic of the vehicle and the engine, which can be calculated from the maximum torque curve of the engine, for is example according to equation (6) above. The term "maximum traction acceleration" means an acceleration generated by the maximum traction force of the vehicle's drive train. In other words, in this case, the vehicle is undergoing maximum acceleration.

According to the invention, the goal is to determine a speed profile which minimizes pollutant emissions, the speed profile comprising at least two phases, each of the phases corresponding to a vehicle acceleration mode, preferably chosen from one of the five acceleration modes defined above. It is therefore a question of determining the number of phases, the sequence of the phases in relation to each other, and the duration of each of the phases of a speed profile. This inverse problem is not analytically invertible with respect to these parameters. Thus, according to the invention and as will be described in step B.3) below, at least one speed profile model, preferably several models, is defined and the pollutant emissions emitted for different durations of the phases of each model are evaluated in order to select the speed profile minimizing pollutant emissions. At this stage of the invention, at least one speed profile model is therefore defined, preferably at least two, and very preferably at least three speed profile models.

According to a first embodiment of the invention, a speed profile model is defined from the following acceleration modes: $u_{NOx}$ (maximum traction acceleration of the low pollutant emission operating range of the engine), $u_{res}$ (traction acceleration equal to the resistive forces), $u_{zero}$ (zero traction acceleration), $u_{braking}$ ((traction acceleration corresponding to the maximum braking of the vehicle).

According to a second embodiment of the invention, a speed profile model is defined from the following acceleration modes: $u_{NOx}$ (maximum traction acceleration of the low pollutant emission operating range of the engine), $u_{res}$ (traction acceleration equal to the resistive forces), $u_{NOx}$ (maximum traction acceleration of the low pollutant engine operating range), $u_{res}$ (traction acceleration equal to the resistive forces), and $u_{zero}$ (zero traction acceleration).

According to a third embodiment of the invention, a speed profile model is defined from the following acceleration modes: $u_{max}$ (maximum traction acceleration of the vehicle), $u_{NOx}$ (maximum traction acceleration of the low emission engine operating range), $u_{res}$ (traction acceleration equal to the resistive forces), $u_{zero}$ (zero traction acceleration), and $u_{braking}$ (traction acceleration corresponding to the maximum braking of the vehicle).

In this method step, a speed profile pattern is defined by a number of phases and an acceleration mode for each phase. The durations of the phases are not specified at this stage of the method. They are optimized later, as described in section B.3 below.

B. Determination of a Pollutant-Minimizing Speed Profile

During this step, a speed profile minimizing the emissions of at least one pollutant is determined for at least a portion of a journey of the vehicle in question, based on information relating to the destination of the vehicle.

As a reminder, a portion of the journey is defined as:
for the first main variant of the invention (implementation of the method and recommendation "in real time"), at least a part of the journey which has not yet been made by the vehicle, such as the remainder of the journey, that is the length of the vehicle's path between the current position of the vehicle and the position of the final destination.

for the second main variant of the invention (implementation "in real time" of the method and "a posteriori" recommendation), a part of the journey already made by the vehicle and included between two breakpoints of the journey.

for the third main variant of the invention (implementation and recommendation "a posteriori"), part or all of the journey already made by the vehicle.

B.1) Measurement of the Position and Current Speed

In this step, the position and current speed of the vehicle during the journey of the vehicle are measured, preferably for at least one time period during the journey of the vehicle.

According to the first main variant of the invention (implementation of the method and recommendation "in real time"), the position and the current speed of the vehicle are measured for at least the time period during the journey of the vehicle. Advantageously, this measurement is repeated throughout the vehicle's journey, for time periods for sampling the total duration of the vehicle's journey.

According to the second main variant of the invention (implementation "in real time" of the method and recommendation "a posteriori"), the current speed and the position of the vehicle are measured for at least the time period during the journey of the vehicle. Advantageously, this measurement is repeated throughout the vehicle's journey, for time periods sampling the total duration of the vehicle's journey.

According to the third main variant of the invention (implementation of the method and recommendation "a posteriori"), the current speed and the position of the vehicle are measured throughout the journey of the vehicle, for a plurality of time periods sampling the total duration of the journey of the vehicle. Thus, according to this third main variant of the invention, the current speed and position of the vehicle are measured for at least one time period during the journey of the vehicle.

In general, the current speed and the position of the vehicle can be measured regularly (constant time period over the duration of the journey) or irregularly (variable time period over the duration of the journey). According to one embodiment of the invention, the current speed and position of the vehicle are measured at least every 10 seconds, preferably every 5 seconds, and very preferably every second. Measurements of the current speed and the position of the vehicle are thus obtained for time periods.

In general, the vehicle's position and current speed can be measured using any geolocation system, for example of the GPS (global positioning system) type or Galileo type, or by a smartphone or any other connected object, such as a connected watch, etc.

Advantageously, motorized vehicle journeys are detected automatically via a smartphone, maximizing the sensitivity of detection of the start of each journey and the accuracy of the data collected, while limiting the battery consumption of the function. This function does not require the permanent use of geolocation (GNSS). It is based on the observation of at least one of GSM antenna changes, and the identification of the user's type of activity, detailed in the previous block. When a change of antenna is detected or the currently detected activity is a journey in a motor vehicle, a car for example, the GNSS sensor of the smartphone is activated for a given time. If the recorded speed measurements correspond to a speed representative of a motor vehicle journey (case of use of a motorized vehicle use) then the recording of a new motor vehicle journey is started and the GNSS remains activated until the end of the journey. The end of the journey is determined by a condition on the speed. At the end of the journey, the recorded data are sent to a server or are stored locally for later transmission (especially if there is no network at the end of the journey). Advantageously, the speed measurements taken from a smartphone are pre-processed. According to an embodiment of the invention, the pre-processing PRT may comprise an oversampling of the signals, followed by a filtering.

B.2) Determination of Journey Parameters

In this step, at least the length, duration, initial speed and final speed of the vehicle for at least a portion of the journey are determined from at least the information regarding the destination of the vehicle, the measurement of the position and the current speed of the vehicle.

According to an embodiment of the invention, the vehicle user can state the destination of the vehicle.

From the destination and the current vehicle position measured in the previous step, a vehicle route is determined in the conventional manner, for example by a shortest path algorithm respecting at least one of the speed limits in force and taking into account the road traffic congestion on this route, and optionally minimizing energy consumption as described for example in EP 3453583 A1. For a predefined portion of the journey, the length of that portion of the journey, the duration of the journey to complete that portion, the initial speed (i.e. the speed at the start of the portion of the journey) and the final speed (i.e. the speed at the end of the portion of the journey) of the vehicle can thus be deduced. Obviously, in a real-time implementation of the method according to the invention (for at least the first and second main variants of the invention), these parameters relating to at least one portion of the vehicle's journey are advantageously updated in real time.

B.3) Determination of an Optimal Speed Profile

In this step, for each of the speed profile models defined in step A.3), a plurality of speed profiles are defined which respect the length, duration, initial speed and final speed determined for the considered portion of the journey, the speed profiles of the same model being distinguished only by the durations of each of the distinct phases.

Then, using the analytical model defined in step A.2) above, for each speed profile model, the emissions of at least one pollutant are determined for each of the speed profiles defined for the speed model in question.

And lastly, the speed profile is selected which minimizes the emissions of at least one pollutant from among all the speed profiles which have been defined, that is the speed profile ultimately selected is the one, from among each of the speed profiles defined for each speed profile model, that produces the lowest emissions of at least one pollutant. In other words, the optimal combination of acceleration modes is sought, as well as the duration of each of the phases of this combination, while still respecting the duration of the portion of the journey that is determined in the previous step. Thus, the method according to the invention does not modify the duration of a journey. The duration of the journey is indeed a constraint of the method according to the invention.

Advantageously, the analytical model of the emissions of at least one pollutant defined by equations (4a) and (4b) above is used to carry out these estimations of the pollutant emissions for speed profiles per speed model, because this analytical model is very economical in terms of calculation time (in the order of a second on a smartphone), which makes it possible to run it several times while making it possible to estimate a speed profile recommendation in real time, including on a smartphone.

B.4) Use of the Optimal Speed Profile

This step of the method according to the invention is optional.

According to an embodiment of the invention, at least part of the optimal speed profile determined in the previous step is displayed, for example on the dashboard of the vehicle, on a website or on an autonomous portable device, such as a geolocation device or a mobile phone. The display may be in real time (for example in the main variants 1 or 2) or a posteriori (for example in the main variants 2 and 3).

According to an embodiment of the invention, the speed profile may also be translated into driving instructions. Generally speaking, the information displayed can lead the driver to adapt driving, depending on this information.

According to an embodiment of the first main variant of the invention, a vehicle, such as an autonomous vehicle, is controlled in real time on the basis of the optimal speed profile determined in the previous step.

According to an embodiment of the invention, in particular of the main variants 2 and 3, an indicator can be constructed from the measurement of the deviation (for example by an estimation of a root mean square) between the speed profile optimized by the method according to the invention and the speed profile actually performed by the vehicle. According to an embodiment of the invention, this indicator can be displayed, for example, on the dashboard of the vehicle, on a website or on an autonomous portable device, such as a geolocation device or a mobile phone.

Thus, the method according to the invention has the following advantages:
- minimization (in a mathematical sense) of pollutant emissions by following a target speed profile
- ability to consider different combinations of polluting emissions to be reduced: CO2, NOx, CO, etc.
- utilization of the approach for different types of vehicles and technologies,
- real-time generation of optimal profiles,
- consideration of real-time traffic conditions for the generation of speed profiles,
- possibility to translate the optimal speed profile into explicit eco-driving instructions for the driver: for example "Accelerate moderately".
- possibility to utilize the determined speed profile to control the speed of an autonomous vehicle and thus ensure that the optimal speed profile is achieved (without driver-induced bias)
- the method according to the invention can be integrated into a vehicle-independent system, such as a smartphone application, since it only requires a GPS measurement as input.
- respect for travel time (at iso distance travelled): pollutants are minimized without increasing travel time.

Examples

The application example described below concerns an application of the method according to the invention to a vehicle having a turbocharged diesel engine with Selective Catalytic Reduction.

The method according to the invention is applied according to the third main variant of the invention described above, that is a speed profile minimizing pollutant emissions is determined a posteriori.

Four journeys are considered, which differ in duration, distance and driving constraints (gradients, traffic lights, speed limits, etc.). These journeys are denoted below as D1, D2, D3, and D4.

A speed profile achieved by a user for each of these journeys is measured, and the NOx emissions associated with this speed profile are also determined by the analytical model described in section A.2) above. The speed profiles of the user for each of these journeys D1 to D4 are represented by the curves denoted by H in FIG. 1.

For comparison purposes, the eco-driving method described in FR 2 994 923 A1 is also applied to these journeys in order to determine a speed profile that minimizes energy consumption. The speed profiles according to the prior art (i.e. minimizing energy consumption) for each of these journeys D1 to D4 are represented by the curves denoted by G in FIG. 1. The emissions, in particular of NOx, associated with these speed profiles are also determined by an analytical model described in section A.2) above.

The method according to the invention is applied by defining three speed profile models corresponding to the three embodiments described in section A.4) above, for each of the four journeys D1 to D4. As the duration of the journeys made by the user and the duration of the journeys determined by the prior art method differ, and as the method according to the third main variant of the invention is applied while preserving the total travel time of the journey, the method according to the invention is applied twice in such a way to minimize the pollutant emissions of the journeys D1 to D4 made by the user, and in such a way as to minimize the pollutant emissions of the journeys D1 to D4 optimized according to the prior art with respect only to energy consumption. The speed profiles determined by the method according to the invention for the four journeys made by the user and for the four journeys resulting from the method according to the prior art are represented respectively by the curves INVH and INVG in FIG. 1. The emissions, in particular of NOx, associated with these speed profiles are also determined by the analytical model described in section A.2) above.

It can be seen that, whatever the displacement D1, D2, D3 or D4, the speed profiles resulting from the method according to the invention (curves INVH and INVG) are characterized by weaker accelerations at start-up, and tend to stabilize around a lower average speed than those of the speed profiles of the user (curve H) or resulting from the method according to the prior art (curve G). It can also be observed that the speed profiles of the user or resulting from the method according to the prior art do not make use of freewheeling, unlike the speed profiles determined by the method according to the invention.

Furthermore, the modelling of emissions for each of these profiles supports a conclusion that a reduction on the order of 34% in NOx emissions is obtained with the method according to the invention when compared to the driving performed by a user, and of the order of 31% on average when compared to the speed profile according to the prior art. A reduction in $CO_2$ emissions of the same order of magnitude is also observed.

Thus, the present invention makes it possible to determine a vehicle speed profile optimized to reduce atmospheric pollutants (such as NOx), while respecting the journey time. It therefore makes it possible to reduce the environmental impact without increasing the journey time. In the context of eco-driving, the optimal speed profile, which may minimize a trade-off between different pollutants, can be communicated to the vehicle driver in real time. In the case of autonomous vehicles, the vehicle can be controlled according to the optimized speed profile according to the invention.

The invention claimed is:

1. A method for determining a speed profile minimizing emissions of at least one pollutant generated by a travelling vehicle moving along a journey which is performed with a computer system comprising:
   (i.) a model of the dynamics of the travelling vehicle using:
   a model of the dynamics of the travelling vehicle wherein:

$$\dot{s}=v$$

$$\dot{v}=u-r(v) \qquad (2)$$

s is the path of the vehicle;
   v is the vehicle speed, and
   u is traction acceleration of the vehicle expressed in an equation:

$$r(v)=a_r+c_rv^2+r_e(i_g) \qquad (1) \text{ in which}$$

$a_r$ is the rolling resistance force divided by the vehicle mass, $C_r$ is the aerodynamic drag force divided by the vehicle mass, $r_e$ is the sum of resistive forces in the transmission, and $i_g$ is a transmission ratio;
   (ii.) an analytical model representing a rate of emission of at least one pollutant at an outlet of the vehicle employing speed and traction acceleration of the vehicle; and
   (iii.) at least one speed profile model divided into at least two phases, each phase of each speed profile model corresponding to an acceleration mode selected from five acceleration modes of the vehicle of: (1) selection from zero traction acceleration, (2) maximum traction acceleration from operation of an engine of the vehicle, (3) traction acceleration equaling resistive forces, (4) traction acceleration corresponding to maximum braking of the vehicle, and (5) maximum traction acceleration of the vehicle, with the acceleration modes of the vehicle being defined by an analytical function depending on a current speed of the vehicle and parameters of the vehicle;

obtaining at least one item of information regarding a destination of the vehicle by a). measuring a position and current speed of the vehicle during the journey of the vehicle, b). determining at least a length, a duration, an initial speed and a final speed of the vehicle for at least a portion of the journey based on the at least one item of information regarding a destination of the vehicle, c.) measuring of a position of the vehicle and a current speed of the vehicle, d.) determining a speed profile minimizing the emissions of the at least one pollutant for at least a portion of the journey, e.) defining for each speed profile model speed profiles relative to distance, duration, initial speed and final speed of the portion of the journey with each speed profile being a duration of each phase of the speed profile, and f). determining the emissions the at least one pollutant for each speed profile by using an analytical model; and selecting speed profiles which minimize the emissions of at least one pollutant from the vehicle defined by each of the speed profile models with the at least a portion of the journey corresponds to a part of the journey that has not yet been made by the vehicle and displaying the speed profile minimizing the emissions of at least one of the pollutants and controlling the vehicle according to the speed profile which minimizes the emissions of at least one of the pollutants on the journey on at least a portion of the journey or basing the speed profile of the vehicle on measurement of speed and location of the vehicle during the journey and quantifying a deviation of the vehicle from the speed profile during the journey which minimizes the emissions of the at least one pollutant from the vehicle when travelling on the journey in accordance with the speed profile and controlling the vehicle according to quantified deviation from speed profile.

2. A method in accordance to claim 1, wherein the acceleration modes of the vehicle are selected from zero traction acceleration, maximum traction acceleration of the engine of the vehicle during travelling on the journey, traction acceleration which equals resistive forces, traction acceleration which corresponds to a maximum braking of the vehicle, and a maximum traction acceleration of the vehicle.

3. A method according to claim 1, wherein one of the speed profile models is divided into four phases comprising successive acceleration modes of maximum traction acceleration of the pollutant emission operation of the engine of the vehicle, the traction acceleration is equal to resistive forces, zero traction acceleration, and traction acceleration corresponding to a maximum braking of the vehicle.

4. A method according to claim 1, wherein the at least one speed profile model is divided into five phases comprising successive acceleration modes of maximum traction acceleration of the pollutant emission operation of the engine of the vehicle, traction acceleration is equal to resistive forces, maximum traction acceleration of the operation of the engine of the vehicle when travelling on the journey, the traction acceleration equals resistive forces and zero traction acceleration.

5. A method according to claim 2, wherein the at least one speed profile model is divided into five phases comprising successive acceleration modes of maximum traction acceleration of the vehicle when travelling on the journey, maximum traction acceleration of the operation of the engine of the vehicle, traction acceleration equals resistive forces, zero traction acceleration, and a traction acceleration corresponding to maximum braking of the vehicle.

6. A method according to claim 1, wherein at least a portion of the journey has already been performed by the vehicle, and the speed profile of the vehicle is determined based on the measurement of the speed and location of the vehicle during the portion of the journey, and an indicator is produced quantifying a deviation of the vehicle from the speed profile which minimizes the emissions of the at least one pollutant when travelling on the journey.

* * * * *